(12) United States Patent
Yu

(10) Patent No.: US 7,992,480 B2
(45) Date of Patent: Aug. 9, 2011

(54) ANGLE INDICATING DEVICE FOR TABLE SAW

(76) Inventor: Ben Yu, Taichung (TW)

( * ) Notice: Subject to any disclaimer, the term of this patent is extended or adjusted under 35 U.S.C. 154(b) by 363 days.

(21) Appl. No.: 12/231,198

(22) Filed: Aug. 29, 2008

(65) Prior Publication Data

US 2010/0051138 A1 Mar. 4, 2010

(51) Int. Cl.
*B26D 7/27* (2006.01)
*B23D 45/04* (2006.01)

(52) U.S. Cl. .......... 83/477.2; 83/471.3; 83/473; 83/490; 83/522.15

(58) Field of Classification Search ............... 83/547.2, 83/471.3, 522.15, 522.12, 581, 490, 767, 83/473, 521, 522.11, 477.1, 522.25, 522.17, 83/522.16, 471.1; 33/640, 641, 628; 700/180; 702/151; 144/420
See application file for complete search history.

(56) References Cited

U.S. PATENT DOCUMENTS

| | | | |
|---|---|---|---|
| 4,516,612 A * | 5/1985 | Wiley | 144/1.1 |
| 4,754,276 A * | 6/1988 | Carlson et al. | 340/870.37 |
| 5,024,257 A | 6/1991 | Lioyd | 144/1 R |
| 6,530,303 B1 | 3/2003 | Parks et al. | 83/473 |
| 6,546,835 B2 | 4/2003 | Wang | 83/477.1 |
| 6,994,004 B2 * | 2/2006 | Gass et al. | 83/62.1 |
| 7,293,490 B2 * | 11/2007 | Chuang | 83/522.15 |
| 2005/0076760 A1 * | 4/2005 | Takano et al. | 83/581 |
| 2006/0266184 A1 * | 11/2006 | Hetcher et al. | 83/471.3 |
| 2006/0266190 A1 * | 11/2006 | Saitou et al. | 83/581 |
| 2007/0084075 A1 * | 4/2007 | Kawano et al. | 33/640 |
| 2009/0084240 A1 * | 4/2009 | Gass et al. | 83/478 |

* cited by examiner

*Primary Examiner* — Ghassem Alie
(74) *Attorney, Agent, or Firm* — Charles E. Baxley

(57) ABSTRACT

A table saw includes a curved channel formed in a supporting base, a cradle attached to the supporting base, an arbor bracket attached to the cradle for supporting a saw blade and a motor, a height shaft attached to the cradle and extended through the curved channel of the base for engaging with the arbor bracket, a tilt shaft attached to the base and engaged with the cradle for adjusting the saw blade relative to the base to selected angular positions, a follower slidably engaged in the curved channel of the base, and a signal generating device attached to the follower for detecting a bevel angle of the arbor bracket and the cradle and the saw blade relative to the base and for precisely showing the angle with digits.

11 Claims, 11 Drawing Sheets

ANGLE INDICATING DEVICE FOR TABLE SAW

BACKGROUND OF THE INVENTION

1. Field of the Invention

The present invention relates to a table saw or a woodworking machine, and more particularly to a table saw including an angle indicating device for precisely indicating the tilting angle of the saw blade relative to the supporting base and for allowing the user to easily and precisely operate the saw blade of the table saw.

2. Description of the Prior Art

Typical table saws comprise a saw blade rotatably supported in a supporting base, and a rotatable elevation wheel and a tilt wheel attached to the supporting base and coupled to the saw blade for adjusting the saw blade relative to the supporting base to any selected or predetermined angular positions in order to suitably cut or machine the work pieces.

For example, U.S. Pat. No. 5,024,257 to Lloyd discloses one of the typical woodworking machines which also comprise a rotatable elevation wheel and a tilt wheel attached to the supporting base and coupled to the saw blade for manually adjusting the saw blade to any selected or predetermined angular positions relative to the supporting base.

However, the typical woodworking machine has no angle indicating devices to indicate the tilting angle of the saw blade relative to the supporting base such that the user may not easily know the angular positions of the saw blade relative to the supporting base and such that the user may not easily and precisely operate the saw blade of the typical woodworking machine.

U.S. Pat. No. 6,530,303 to Parks et al. discloses another typical table saw comprising a height crank wheel coupled to a saw blade for manually adjusting the saw blade to any selected or predetermined angular positions relative to a supporting base, and a bevel pointer movably attached to the supporting base and indicated along a scale for showing the bevel angle of the saw blade relative to the supporting base.

However, the angular positions of the saw blade relative to the supporting base may not be precisely read the user unless the user is precisely stood in front of the bevel pointer and the scale, and the angular positions of the saw blade relative to the supporting base may only be roughly estimated by reading the digit or graduation provided on the scale.

U.S. Pat. No. 6,546,835 to Wang discloses a further typical table saw comprising two handles coupled to two threaded shafts respectively which are engaged with the saw blade for manually adjusting the saw blade to any selected or predetermined angular positions relative to the supporting base.

However, similarly, the typical table saws also have no angle indicating devices to indicate the tilting angle of the saw blade relative to the supporting base such that the user may not easily know the angular positions of the saw blade relative to the supporting base and such that the user may not easily and precisely operate the saw blade of the table saw.

The present invention has arisen to mitigate and/or obviate the afore-described disadvantages of the conventional angle indicating devices for the table saws.

SUMMARY OF THE INVENTION

The primary objective of the present invention is to provide a table saw including an angle indicating device for precisely indicating the tilting angle of the saw blade relative to the supporting base and for allowing the user to easily and precisely operate the saw blade of the table saw.

In accordance with one aspect of the invention, there is provided a table saw comprising a supporting base including a chamber formed therein, and including a curved channel formed therein and communicating with the chamber of the supporting base, a cradle pivotally attached to the supporting base, and including a bevel sector gear having a rack provided on the bevel sector gear of the cradle, an arbor bracket pivotally attached to the cradle with a pivot rod for allowing the arbor bracket to be pivoted relative to the cradle, and including a bevel sector gear having a rack provided on the bevel sector gear of the arbor bracket, a height shaft rotatably attached to the cradle and extended out through the curved channel of the supporting base, and including a worm engaged with the rack of the bevel sector gear of the arbor bracket for pivoting the bevel sector gear and the arbor bracket relative to the cradle and the supporting base, a saw blade rotatably attached to the arbor bracket with an axle, a motor attached to the arbor bracket and coupled to the axle of the saw blade for rotating the saw blade, a tilt shaft rotatably attached to the supporting base and including a worm engaged with the rack of the bevel sector gear of the cradle for pivoting the bevel sector gear of the cradle and the arbor bracket relative to the supporting base 10 and for adjusting the saw blade relative to the supporting base to selected angular positions, a follower slidably engaged in the curved channel of the supporting base moveable along the curved channel of the supporting base with the height shaft, and a signal generating device attached to the follower for detecting a relative position between the height shaft and the follower and for detecting a bevel angle of the arbor bracket and the cradle and the saw blade relative to the supporting base and for allowing the user to easily and precisely operate the saw blade of the table saw.

The supporting base includes a signaling device attached to the supporting base and aligned with the curved channel of the supporting base for acting with the signal generating device and for generating the angle signals.

The signaling device includes a number of signaling members provided thereon, and the signal generating device is provided for acting with the signaling members of the signaling device and for generating the angle signals.

The signaling members are magnetic members and the signal generating device is a magnetic device for acting with the magnetic signaling members of the signaling device and for generating the angle signals to indicate the bevel angle of the arbor bracket and the cradle and the saw blade relative to the supporting base.

The supporting base includes a scale attached to the supporting base and aligned with the curved channel of the supporting base for supporting the signaling device. The scale includes a graduation provided on the scale, and the signaling device includes a number of signaling members aligned with the graduation of the scale for acting with the signal generating device.

The follower includes a pointer attached to the follower and moved in concert with the height shaft and moveable along the curved channel of the supporting base and the scale for indicating the bevel angle of the arbor bracket and the cradle and the saw blade relative to the supporting base.

The follower includes an aperture formed therein for rotatably receiving and supporting the height shaft and for allowing the follower to be moved along the curved channel of the supporting base by the height shaft.

A control device is further provided for receiving the signal from the signal generating device and for processing the signal to indicate the bevel angle of the arbor bracket and the cradle and the saw blade relative to the supporting base.

The control device includes a processor device for receiving the signal from the signal generating device, and includes a displayer coupled to the processor device for showing the bevel angle of the arbor bracket and the cradle and the saw blade relative to the supporting base.

The control device includes a reset switch coupled to the processor device for signal resetting purposes, or for resetting or calibrating the signal from the signal generating device and/or for resetting or calibrating the processor device.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
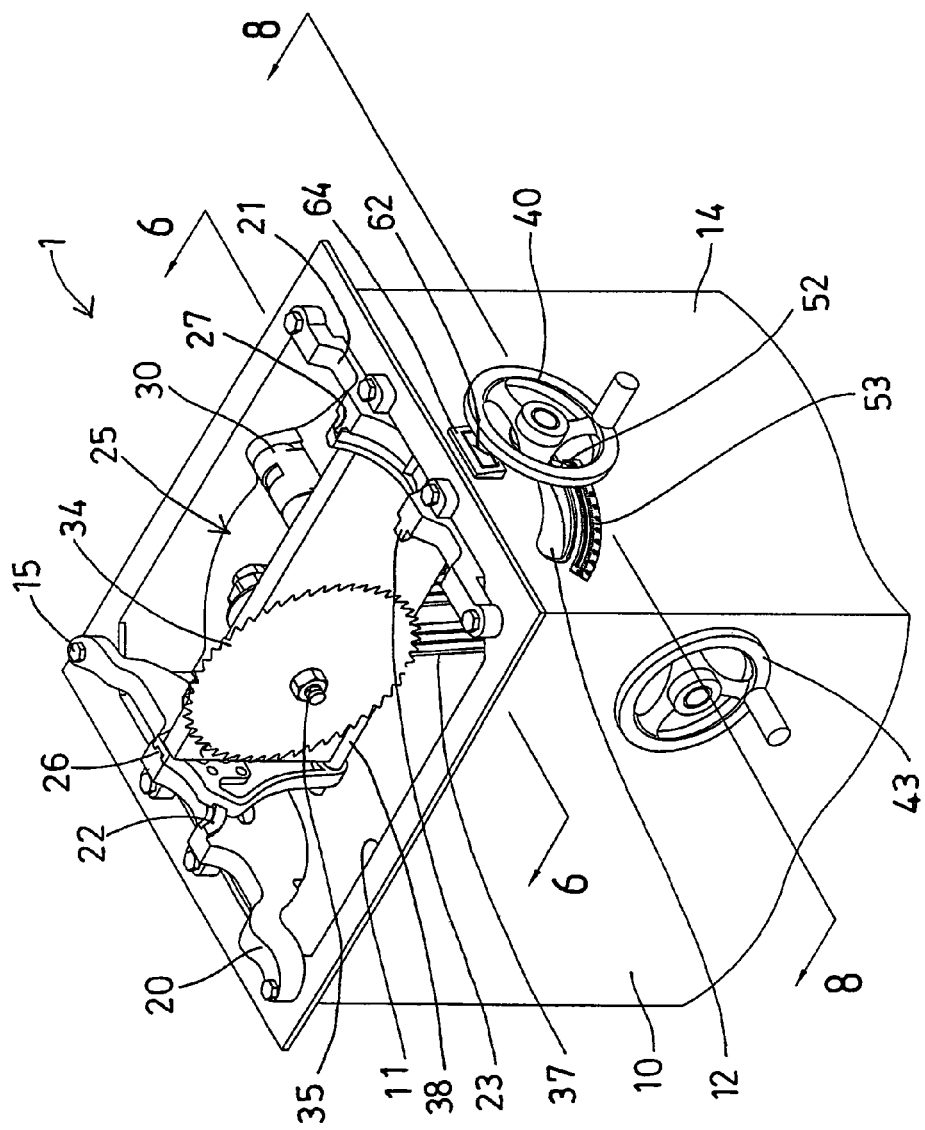
FIG. 1 is a partial perspective view of a table saw in accordance with the present invention.
Figure 2:
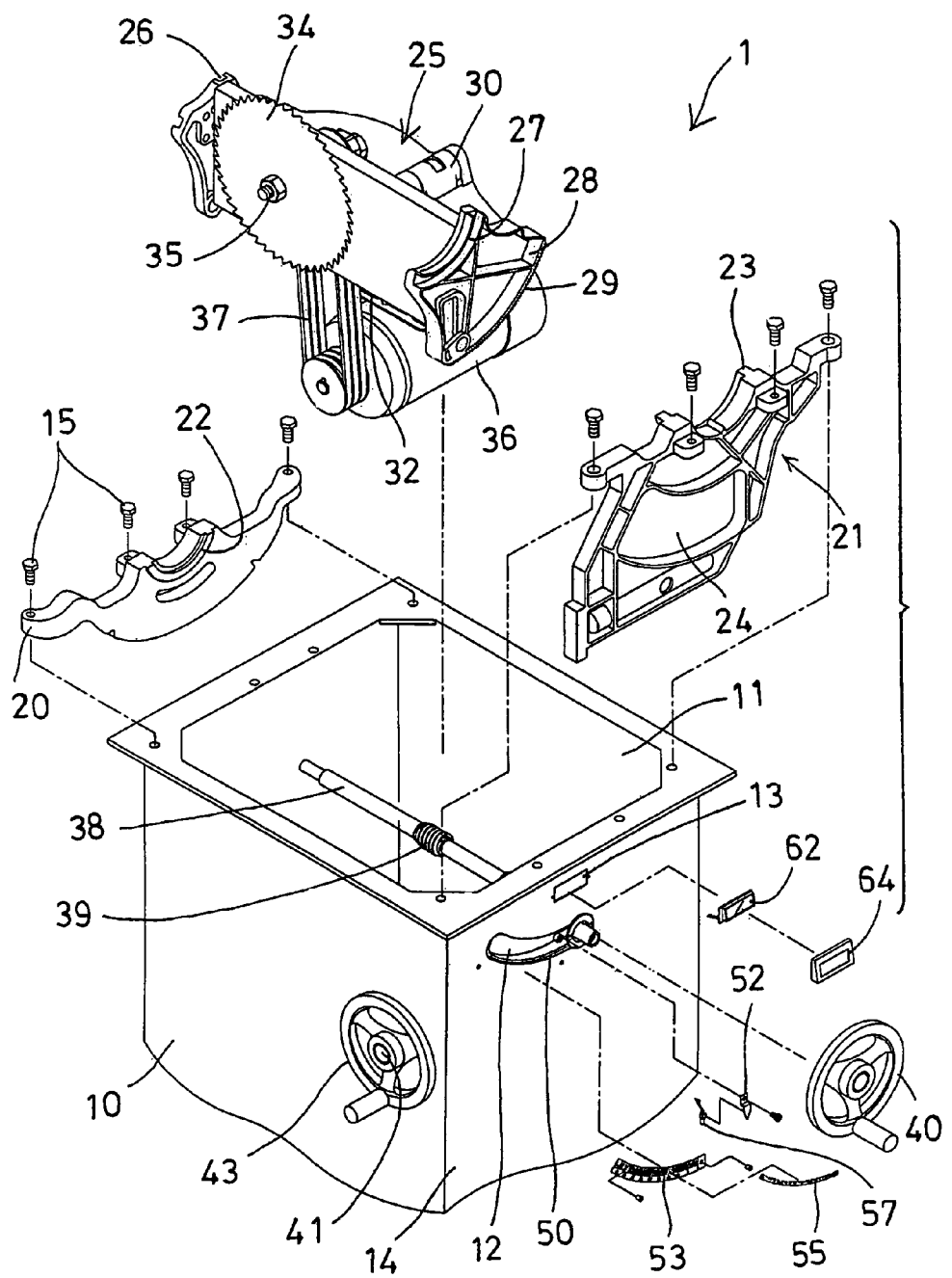
FIG. 2 is a partial exploded view of the table saw.
Figure 3:
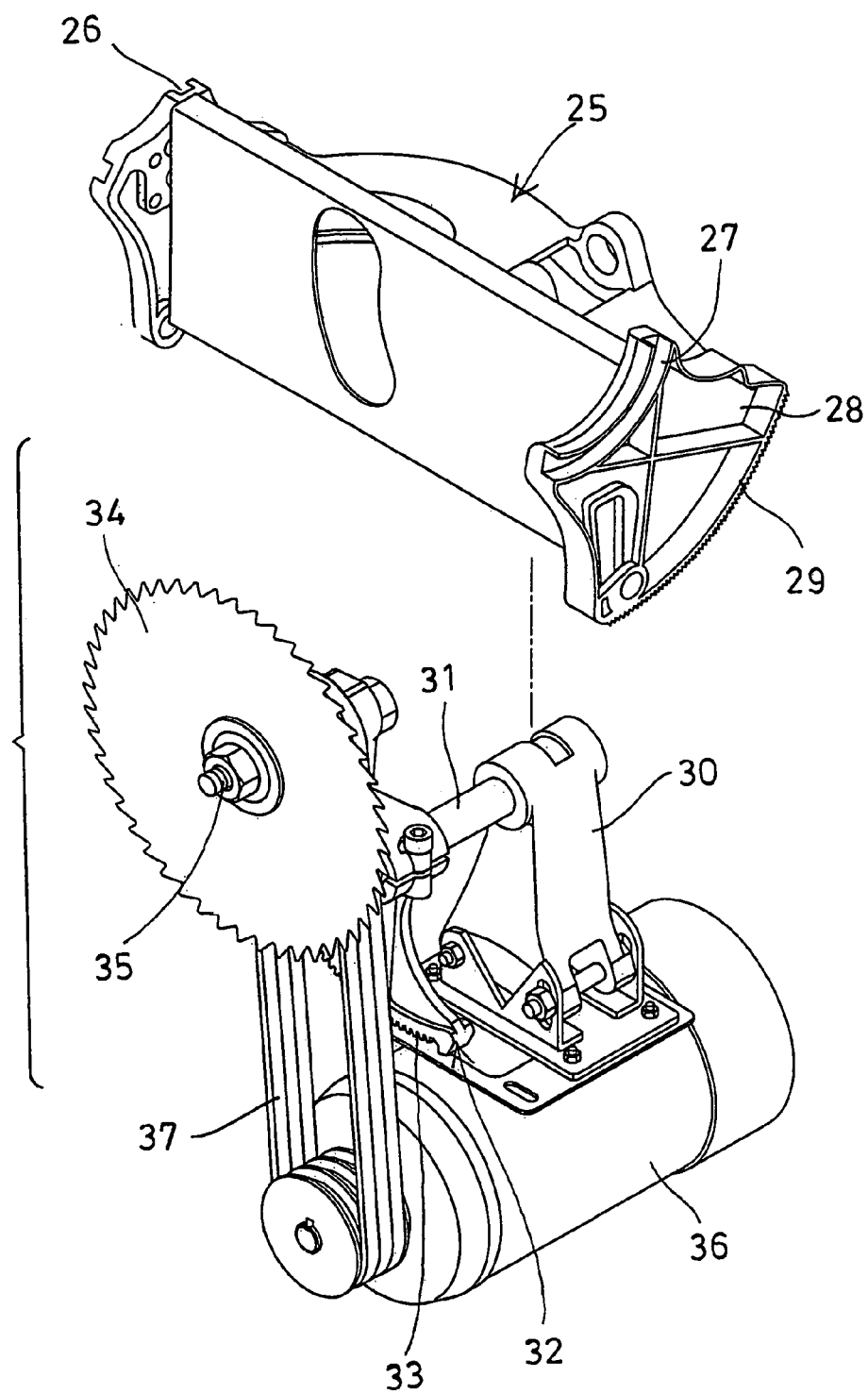
FIG. 3 is another partial exploded view of the table saw.
Figures 4, 5:
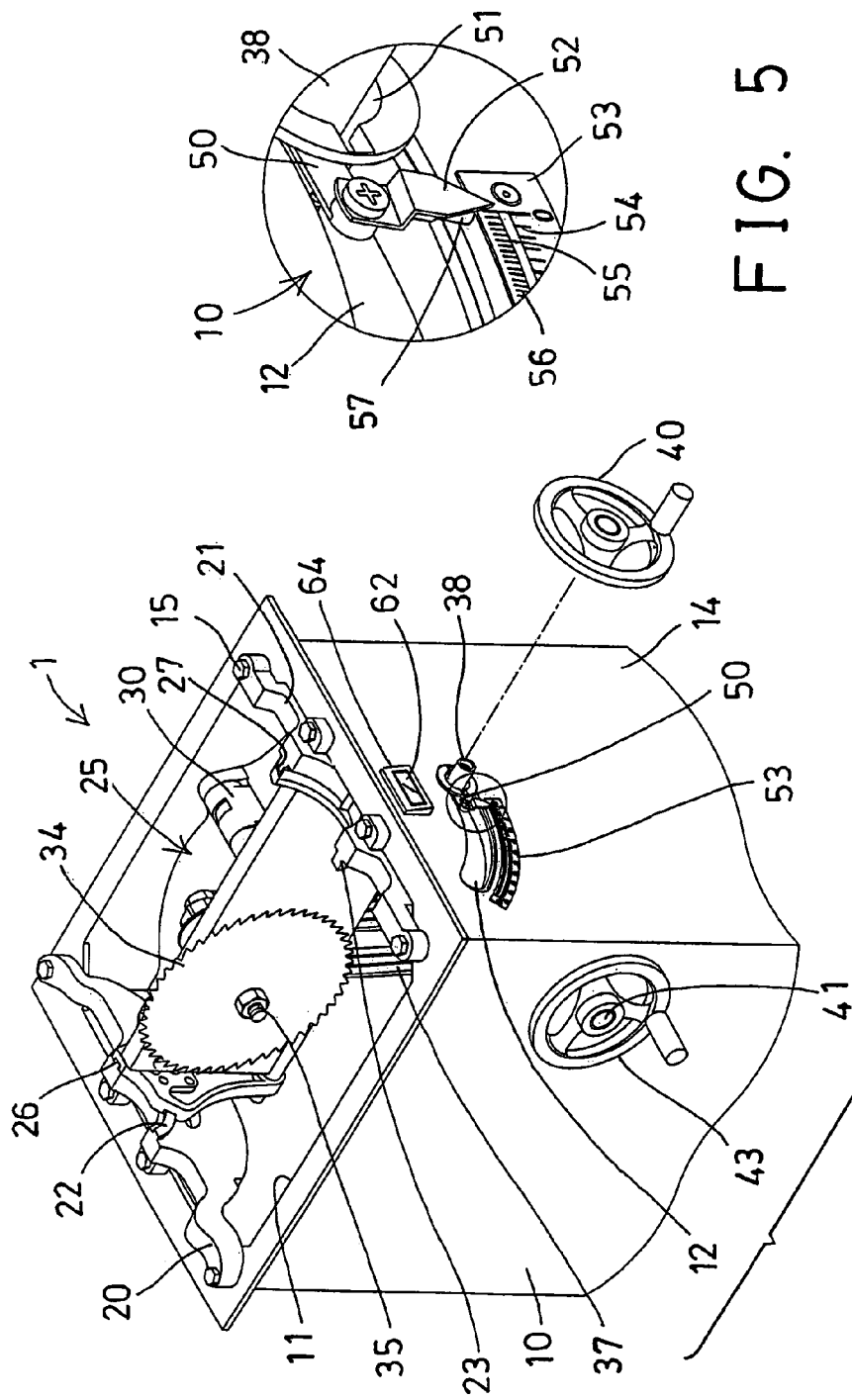
FIG. 4 is a further partial exploded view of the table saw.
FIG. 5 is an enlarged partial perspective view of the table saw.
Figure 6:
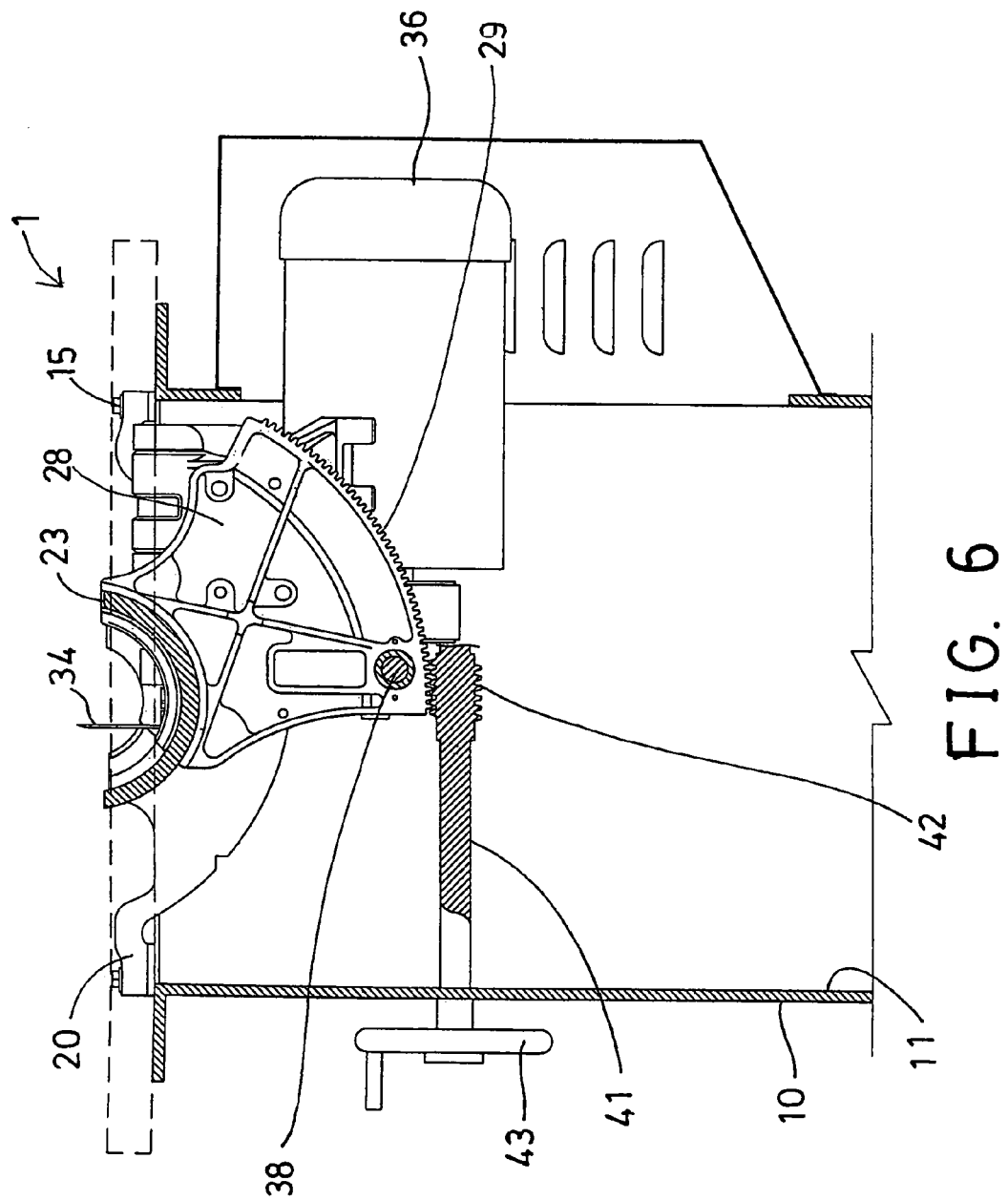
FIG. 6 is a partial cross sectional view of the table saw taken along lines 6-6 of FIG. 1.
Figure 7:
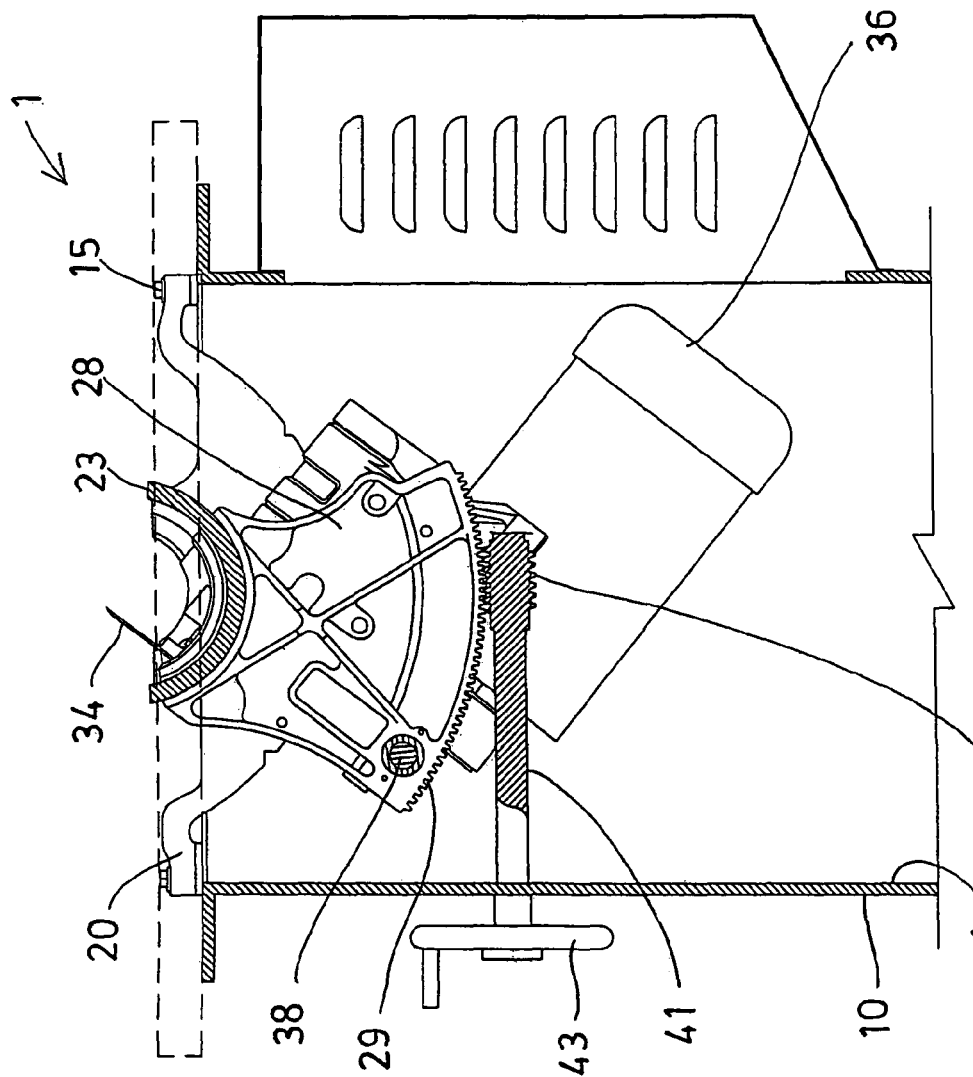
FIG. 7 is a partial cross sectional view similar to FIG. 6, illustrating the operation of the table saw.
Figure 8:
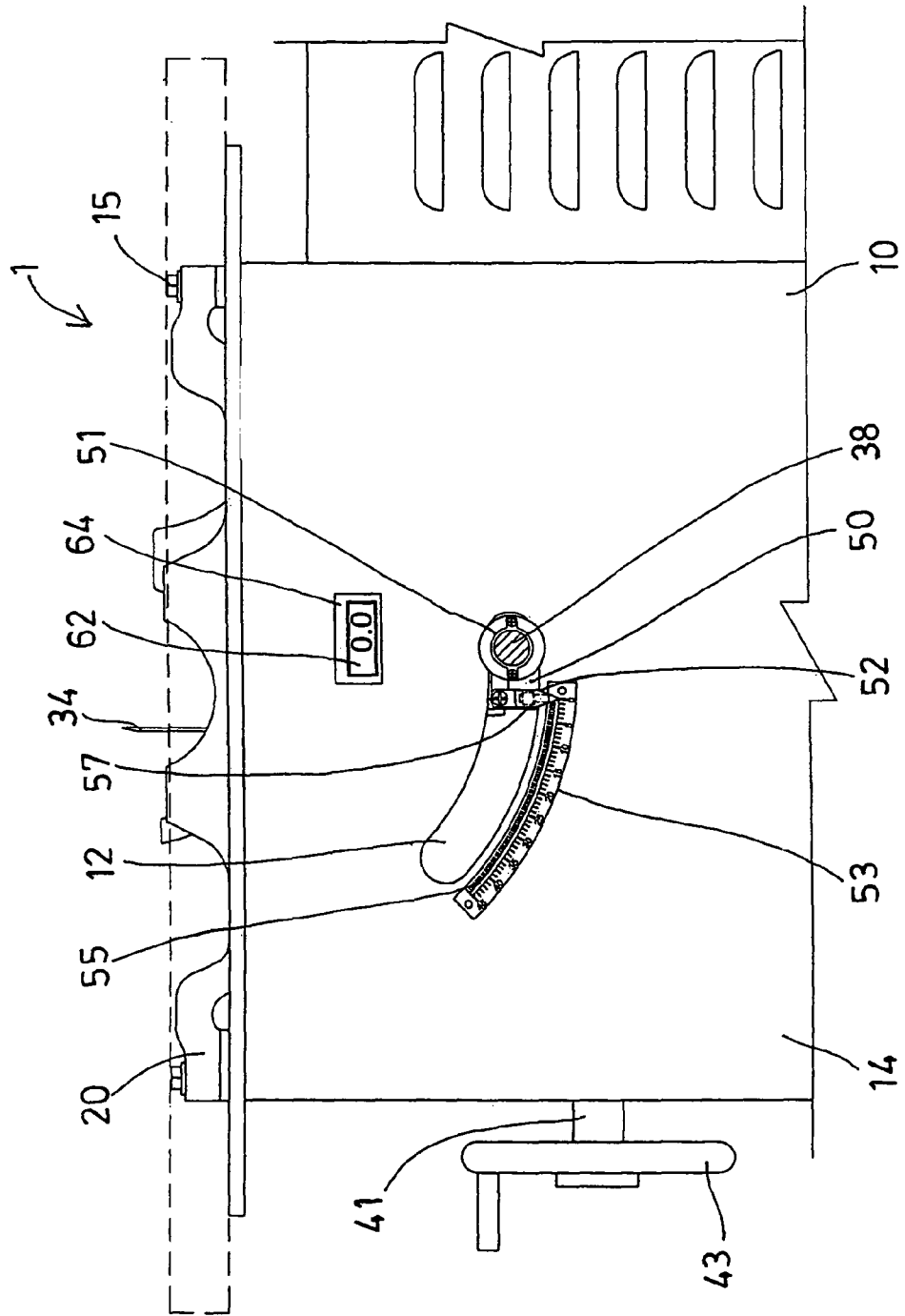
FIG. 8 is another partial cross sectional view of the table saw taken along lines 8-8 of FIG. 1.
Figure 9:
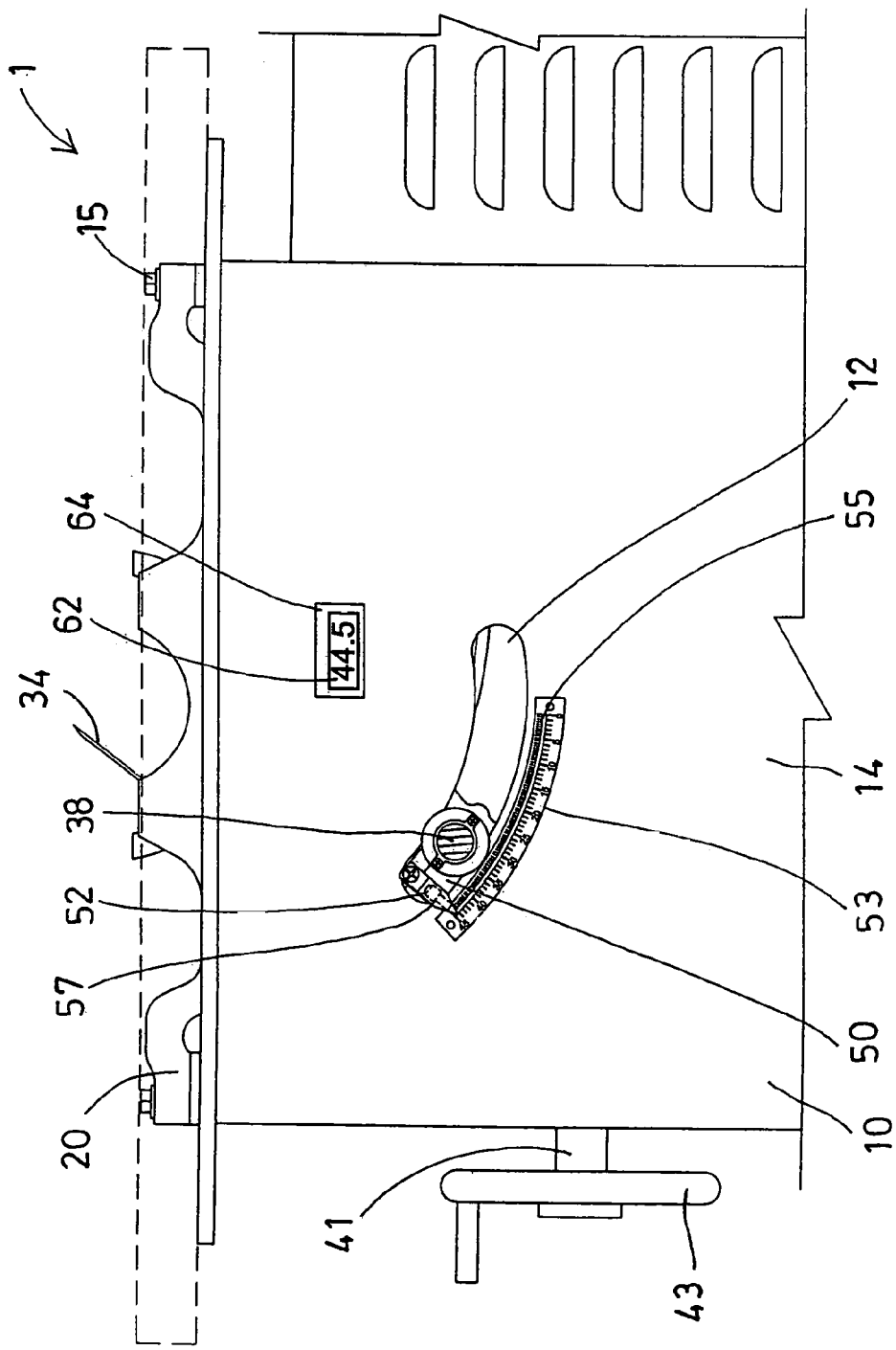
FIG. 9 is a further partial cross sectional view similar to FIG. 8, illustrating the operation of the table saw.
Figure 10:
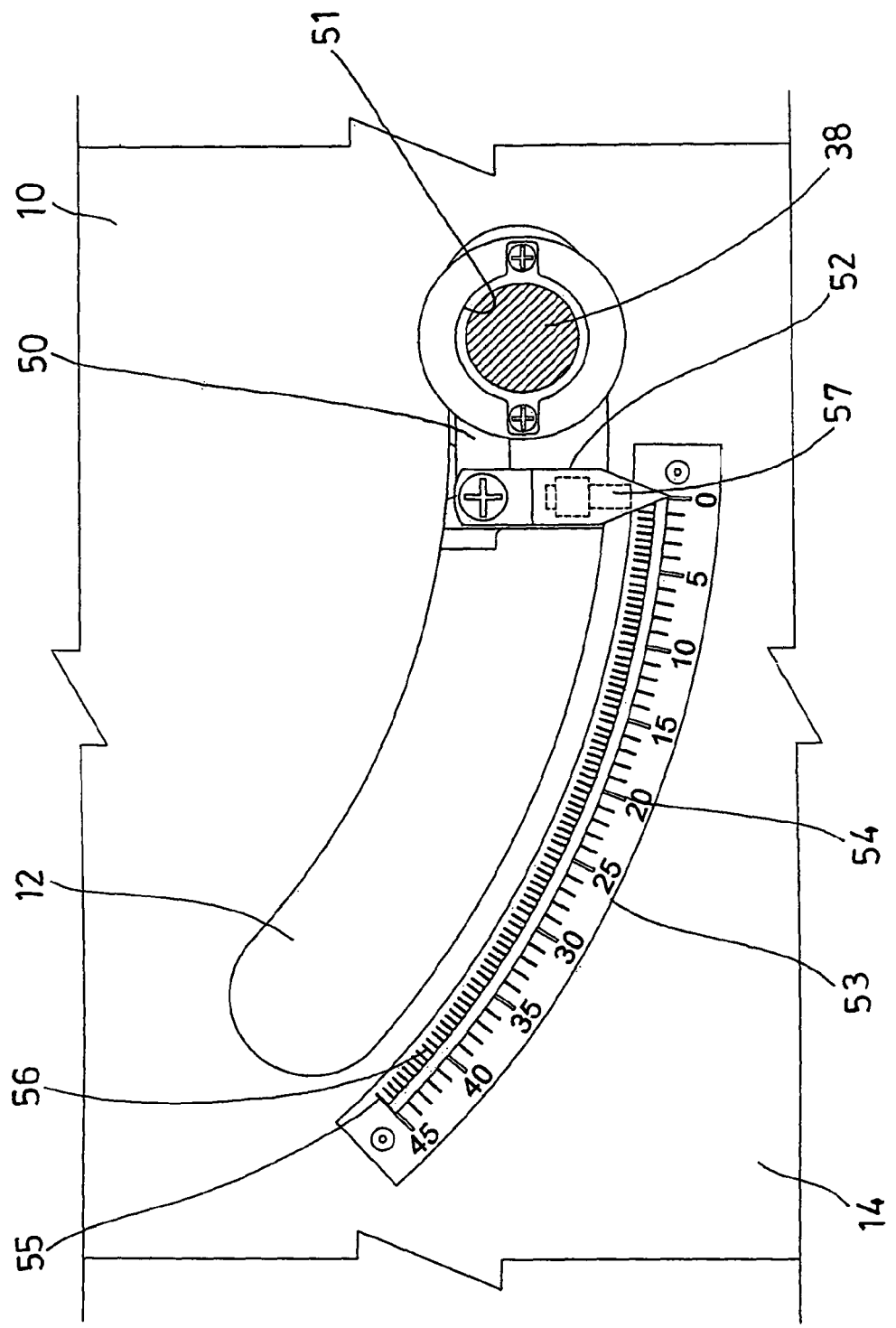
FIG. 10 is an enlarged partial cross sectional view illustrating the angle indicating device of the table saw.
Figure 11:
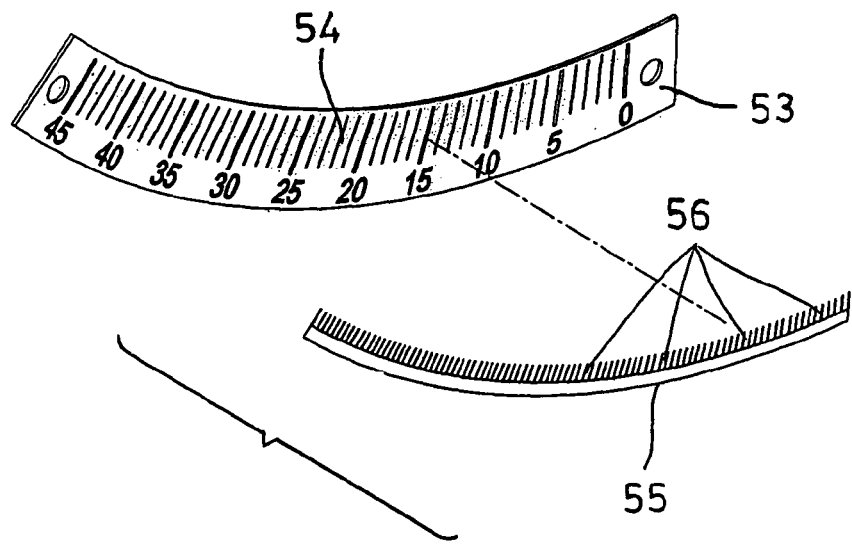
FIGS. 11, 12 are partial exploded views illustrating the angle indicating device of the table saw.
Figure 12:
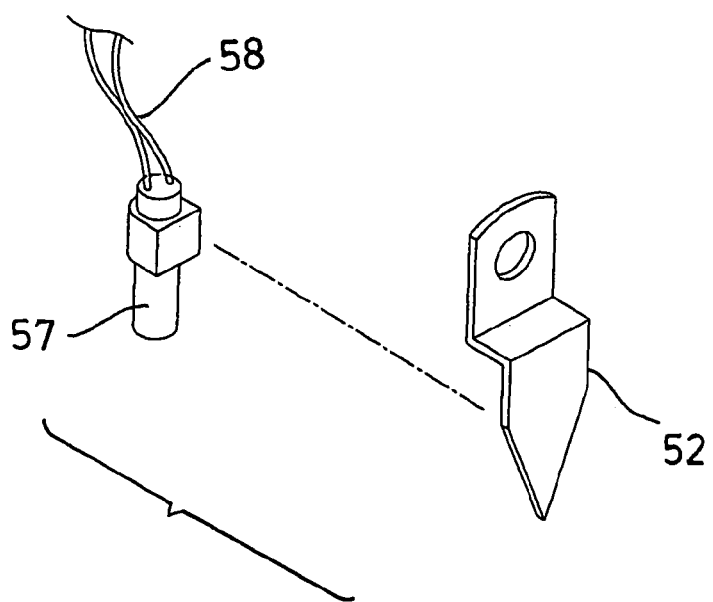

Referring to the drawings, and initially to FIGS. 1-6, a table saw 1 in accordance with the present invention comprises an outer housing or supporting base 10 including a chamber 11 formed therein, and including a curved channel 12 and an orifice 13 (FIG. 2) formed in one of four side walls 14 of the supporting base 10 and communicating with the chamber 11 of the supporting base 10, and comprises two trunnion brackets 20, 21 engaged into the chamber 11 of the supporting base 10 and attached or secured or mounted to the supporting base 10 with latches or fasteners 15 for rotatably or pivotally supporting a cradle 25, the trunnion brackets 20, 21 each include a curved grooves or rails or tracks 22, 23 formed or provided thereon, and one of the trunnion brackets 21 includes an opening 24 formed therein (FIG. 2) and aligned with or communicating with the curved channel 12 of the supporting base 10.

The cradle 25 includes two curved rails or grooves or tracks 26, 27 formed or provided in the opposite side portions and rotatably or pivotally or slidably engaged with the curved tracks 22, 23 of the trunnion brackets 20, 21 for rotatably or pivotally attaching or securing or mounting the cradle 25 to the supporting base 10 with the trunnion brackets 20, 21 and for allowing the cradle 25 to be rotated or pivoted relative to the trunnion brackets 20, 21 and the supporting base 10, and includes a bevel sector gear 28 having a rack 29 formed or provided on the bottom portion of the bevel sector gear 28. An arbor bracket 30 is rotatably or pivotally attached or secured or mounted or coupled to the cradle 25 with a pivot rod 31 for allowing the arbor bracket 30 to be rotated or pivoted relative to the cradle 25, and also for allowing the arbor bracket 30 to be rotated or pivoted relative to the supporting base 10 together with the cradle 25.

The arbor bracket 30 also includes a bevel sector gear 32 having a rack 33 formed or provided on the bottom portion of the bevel sector gear 32 (FIG. 3), a saw blade 34 is rotatably attached or secured or mounted or coupled to the arbor bracket 30 with an axle 35, and a motor 36 is attached or secured or mounted to the arbor bracket 30 and coupled to the axle 35 of the saw blade 34 with a sprocket-and-chain or belt coupling device 37 for allowing the saw blade 34 to be rotated or driven by the motor 36. A height shaft 38 is rotatably attached or mounted to the cradle 25 and extended out through the curved channel 12 of the supporting base 10 (FIGS. 2, 4), and includes a worm 39 formed or provided thereon and engaged with the rack 33 of the bevel sector gear 32 of the arbor bracket 30 for rotating or pivoting the bevel sector gear 32 and the arbor bracket 30 relative to the cradle 25 and the supporting base 10 and for adjusting the height of the saw blade 34 relative to the cradle 25 and the supporting base 10. An elevation wheel 40 is attached or secured or mounted to the height shaft 38 for rotating the height shaft 38 and the worm 39 relative to the supporting base 10.

As shown in FIGS. 6-9, a tilt shaft 41 is rotatably attached or mounted to the supporting base 10 and also includes a worm 42 formed or provided thereon and engaged with the rack 29 of the bevel sector gear 28 (FIGS. 6, 7) for rotating or pivoting the bevel sector gear 28 and the cradle 25 and the arbor bracket 30 relative to the supporting base 10 and for adjusting or tilting the saw blade 34 relative to the supporting base 10 to any selected or predetermined or required angular positions, and a tilt wheel 43 is attached or secured or mounted to the tilt shaft 41 for rotating the tilt shaft 41 and the worm 42 relative to the supporting base 10 and for adjusting or tilting the saw blade 34 to suitably cut or machine the work pieces (not shown). The above-described structure is typical and will not be described in further details.

The table saw 1 in accordance with the present invention further comprises a slide or seat or follower 50 slidably engaged in the curved channel 12 of the supporting base 10 (FIGS. 2, 4 and 8-10, and the follower 50 includes an aperture 51 formed therein (FIG. 10) for rotatably receiving the height shaft 38 and for allowing the follower 50 to be moved along the curved channel 12 of the supporting base 10 by the height shaft 38. A pointer 52 is attached or secured or mounted to the follower 50 and moved in concert with the height shaft 38 along the curved channel 12 of the supporting base 10. A scale 53 is attached or secured or mounted to the supporting base 10 and disposed and aligned with the curved channel 12 of the supporting base 10, and includes a graduation 54 formed or provided on the scale 53, and the pointer 52 is movable along the scale 53 for indicating or showing the bevel angle of the arbor bracket 30 and the cradle 25 and the saw blade 34 relative to the supporting base 10.

As shown in FIGS. 2, 5, and 8-12, a signaling device 55 is attached or secured or mounted to the supporting base 10 and disposed and aligned with the curved channel 12 of the supporting base 10, or directly attached or secured or mounted to the scale 53, and includes a number of signaling members 56, such as magnetic members 56 provided thereon or extended therefrom and aligned with the graduation 54 of the scale 53. A sensing or detecting or signal generating device 57 is attached or secured or mounted to the pointer 52 and/or to the follower 50 and moved in concert with the pointer 52 and the follower 50 and thus movable relative to the scale 53 and the signaling device 55 for acting with the signaling device 55 and for sensing or detecting the relative position between the pointer 52 and the signal generating device 57 and the signaling device 55 and the scale 53 and thus for sensing or detecting the bevel angle of the arbor bracket 30 and the cradle 25 and the saw blade 34 relative to the supporting base 10.

Figure 13:
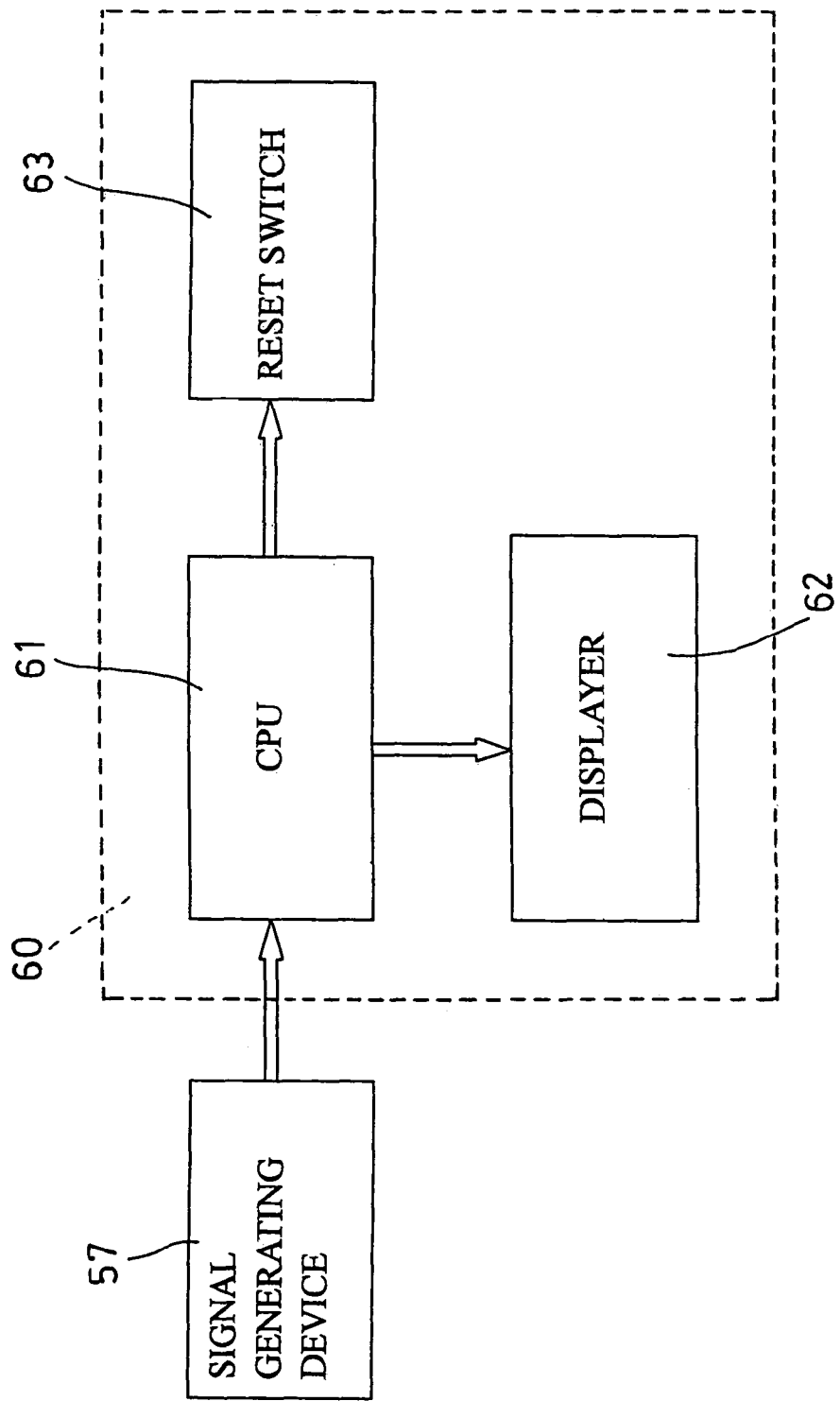
FIG. 13 is a block diagram illustrating the parts of angle indicating device for the table saw.

The signal generating device 57 may be selected from an infrared generating and/or receiving device, a magnetic device for acting with the magnetic signaling members 56 and for generating a signal to indicate the bevel angle of the arbor bracket 30 and the cradle 25 and the saw blade 34 relative to the supporting base 10, and the signal generating device 57 may be coupled to an electric circuit or control device 60 (FIG. 13) wirelessly or with electric wires or cables 58 (FIG. 12) and for sending the signal to the control device 60. As shown in FIG. 13, the control device 60 includes a central processing unit (CPU) or processor device 61 coupled to the signal generating device 57 for receiving the signal from the signal generating device 57 and for calculating or processing the signal from the signal generating device 57, and includes a displayer 62 coupled to the processor device 61 for showing the bevel angle of the arbor bracket 30 and the cradle 25 and the saw blade 34 relative to the supporting base 10, and includes a reset switch 63 also coupled to the processor device 61 for resetting or calibrating the signal from the signal generating device 57 and/or for resetting or calibrating the processor device 61.

In operation, as shown in FIGS. 6-10, the bevel sector gear 28 and the cradle 25 and the arbor bracket 30 may be rotated or pivoted relative to the supporting base 10 by rotating the tilt wheel 43 and the tilt shaft 41 and the worm 42 relative to the supporting base 10 in order to adjust or to tilt the saw blade 34 relative to the supporting base 10 to any selected or predetermined or required angular positions. When the bevel sector gear 28 and the cradle 25 and the arbor bracket 30 are rotated or pivoted relative to the supporting base 10, the height shaft 38 may be forced to move along the curved channel 12 of the supporting base 10, and the pointer 52 may be actuated to move along the scale 53 in order to indicate or to show the bevel angle of the arbor bracket 30 and the cradle 25 and the saw blade 34 relative to the supporting base 10. The signal generating device 57 may detect and generate signals to indicate the bevel angle of the arbor bracket 30 and the cradle 25 and the saw blade 34 relative to the supporting base 10 and to send the signals to the processor device 61 of the control device 60 when the signal generating device 57 is moved along or relative to the signaling device 55.

It is to be noted that the signaling device 55 and the signal generating device 57 may also be selected from an infrared generating and/or receiving device or the like for sensing or detecting the relative movement between the signaling device 55 and the signal generating device 57 and for showing the bevel angle of the arbor bracket 30 and the cradle 25 and the saw blade 34 relative to the supporting base 10. The processor device 61 of the control device 60 may receive and calculate or process the signal from the signal generating device 57 in order to precisely show or indicate the bevel angle of the arbor bracket 30 and the cradle 25 and the saw blade 34 relative to the supporting base 10 for up to two digits following the decimal point. A casing 64 may be attached or secured or mounted to the supporting base 10 and aligned with the orifice 13 of the supporting base 10 for supporting the displayer 62 and for attaching or securing or mounting the displayer 62 to the supporting base 10 and arranged for allowing the displayer 62 to be easily and clearly seen by the user.

It is further to be noted that the relative sliding movement between the signaling device 55 and the signal generating device 57 is substantially equals to or proportional to the bevel angle of the arbor bracket 30 and the cradle 25 and the saw blade 34 relative to the supporting base 10, such that the bevel angle of the arbor bracket 30 and the cradle 25 and the saw blade 34 relative to the supporting base 10 may be precisely sensed or detected or obtained without error.

Accordingly, the table saw in accordance with the present invention includes an angle indicating device for precisely indicating the tilting angle of the saw blade relative to the supporting base and for allowing the user to easily and precisely operate the saw blade of the table saw.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A table saw comprising:
    a supporting base including a chamber formed therein, and including a curved channel formed therein and communicating with said chamber of said supporting base,
    a cradle pivotally attached to said supporting base, and including a bevel sector gear having a rack provided on said bevel sector gear of said cradle,
    an arbor bracket pivotally attached to said cradle with a pivot rod for allowing said arbor bracket to be pivoted relative to said cradle, and including a bevel sector gear having a rack provided on said bevel sector gear of said arbor bracket,
    a height shaft rotatably attached to said cradle and extended out through said curved channel of said supporting base, and including a worm engaged with said rack of said bevel sector gear of said arbor bracket for pivoting said bevel sector gear and said arbor bracket relative to said cradle and said supporting base,
    a saw blade rotatably attached to said arbor bracket with an axle,
    a motor attached to said arbor bracket and coupled to said axle of said saw blade for rotating said saw blade,
    a tilt shaft rotatably attached to said supporting base and including a worm engaged with said rack of said bevel sector gear of said cradle for pivoting said bevel sector gear of said cradle and said arbor bracket relative to said supporting base and for adjusting said saw blade relative to said supporting base to selected angular positions,
    a follower slidably engaged in said curved channel of said supporting base moveable along said curved channel of said supporting base with said height shaft, and
    a signal generating device attached to said follower for detecting a relative position between said height shaft and said supporting base and for detecting a bevel angle of said arbor bracket and said cradle and said saw blade relative to said supporting base.

2. The table saw as claimed in claim 1, wherein said supporting base includes a signaling device attached to said supporting base and aligned with said curved channel of said supporting base for acting with said signal generating device.

3. The table saw as claimed in claim 2, wherein said signaling device includes a plurality of signaling members provided thereon, and said signal generating device is provided for acting with said signaling members of said signaling device.

4. The table saw as claimed in claim 3, wherein said signaling members are magnetic members and said signal generating device is a magnetic device for acting with said magnetic signaling members of said signaling device and for generating a signal to indicate the bevel angle of said arbor bracket and said cradle and said saw blade relative to said supporting base.

5. The table saw as claimed in claim 2, wherein said supporting base includes a scale attached to said supporting base and aligned with said curved channel of said supporting base for supporting said signaling device.

6. The table saw as claimed in claim 5, wherein said scale includes a graduation provided on said scale, and said signaling device includes a plurality of signaling members aligned with said graduation of said scale.

7. The table saw as claimed in claim 5, wherein a pointer attached to said follower and moved in concert with said height shaft and moveable along said curved channel of said supporting base and said scale for indicating the bevel angle of said arbor bracket and said cradle and said saw blade relative to said supporting base.

8. The table saw as claimed in claim 1, wherein said follower includes an aperture formed therein for rotatably receiving said height shaft and for allowing said follower to be moved along said curved channel of said supporting base by said height shaft.

9. The table saw as claimed in claim 1 further comprising a control device for receiving the signal from said signal generating device and for processing the signal from said signal generating device to indicate the bevel angle of said arbor bracket and said cradle and said saw blade relative to said supporting base.

10. The table saw as claimed in claim 9, wherein said control device includes a processor device for receiving the signal from said signal generating device, and said control device includes a displayer coupled to said processor device for showing the bevel angle of said arbor bracket and said cradle and said saw blade relative to said supporting base.

11. The table saw as claimed in claim 9, wherein said control device includes a reset switch coupled to said processor device for signal resetting purposes.

* * * * *